United States Patent [19]

De Lyon et al.

[11] Patent Number: 5,683,180
[45] Date of Patent: Nov. 4, 1997

[54] METHOD FOR TEMPERATURE MEASUREMENT OF SEMICONDUCTING SUBSTRATES HAVING OPTICALLY OPAQUE OVERLAYERS

[75] Inventors: Terence J. De Lyon, Newbury Park; John A. Roth, Ventura, both of Calif.

[73] Assignee: Hughes Aircraft Company, Los Angeles, Calif.

[21] Appl. No.: 305,129

[22] Filed: Sep. 13, 1994

[51] Int. Cl.$^6$ .................................................. G01K 11/00
[52] U.S. Cl. .................................. 374/161; 374/120
[58] Field of Search .................................. 374/161, 120; 257/467

[56] References Cited

U.S. PATENT DOCUMENTS

| | | | |
|---|---|---|---|
| 4,695,859 | 9/1987 | Guha et al. | 257/81 |
| 4,794,431 | 12/1988 | Park | 257/82 |
| 4,841,150 | 6/1989 | Walter | 374/161 |
| 5,118,200 | 6/1992 | Kirillov et al. | 374/161 |
| 5,167,452 | 12/1992 | Amith et al. | 374/161 |
| 5,208,643 | 5/1993 | Fair | 374/161 |
| 5,388,909 | 2/1995 | Johnson et al. | 374/120 |

FOREIGN PATENT DOCUMENTS

| | | | |
|---|---|---|---|
| 0225627 | 10/1986 | Japan | 374/161 |

OTHER PUBLICATIONS

"Noncontact temperature monitoring of semiconductors by optical absorption edge sensing", Abstract, Michael E. Adel et al, SPIE, vol. IS03, Microelectronic Process, San Jose, Sep. 1992.

"Extension of infrared–laser interferometric thermometry to silicon wafers polished on only one side", V.M. Donnolly, Appl. Phys. Lett. 63(10), 6 Sep. 1993.

Weilmeier, M.K. et al., "A New Optical Temperature Measurement Technique for Semiconductor Substrates in Molecular Beam Epitaxy," Can. J. Phys., vol. 69, pp. 422–426 (1991).

*Primary Examiner*—Diego F. F. Gutierrez
*Attorney, Agent, or Firm*—V. D. Duraiswamy; W. K. Denson-Low

[57] ABSTRACT

A method and apparatus for enabling the use of optical techniques for temperature measurement of a semiconducting substrate coated with an optically opaque overlayer. A reflective mirror structure is inserted between the semiconducting substrate and the optically opaque overlayer. The reflective structure prevents the overlayer from absorbing light transmitted through the semiconducting substrate and instead reflects the light, thereby restoring the substrate front-surface reflectivity required for temperature measurement analysis by optical techniques such as absorption edge reflectance spectroscopy.

14 Claims, 5 Drawing Sheets

METHOD FOR TEMPERATURE MEASUREMENT OF SEMICONDUCTING SUBSTRATES HAVING OPTICALLY OPAQUE OVERLAYERS

BACKGROUND OF THE INVENTION

1. Field of the Invention

The present invention is directed to measuring the temperature of semiconducting substrates, and, more particularly, to a method of noncontact temperature measurement made from the backside of semiconductor substrates having optically opaque overlayers on the frontside.

2. Description of Related Art

During the manufacturing of electronic and optical devices, the measurement and control of semiconducting substrate temperature is critical. However, measuring the temperature of the substrate during processing is complicated by the fact that such measurements often must be made without contacting the substrate itself. A method of substrate temperature measurement is known that is based on the sensing of the change in substrate bandgap by optical spectroscopic measurements sensitive to the substrate optical absorption edge. Two distinct embodiments of this measurement technique are known. In absorption edge transmission spectroscopy (see, e.g., E. S. Hellman et al, "Infra-Red Transmission Spectroscopy of GaAs During Molecular Beam Epitaxy," *Journal of Crystal Growth*, Vol. 81, pp. 38–42 (1987)), sensing of the semiconducting substrate absorption edge is achieved by analyzing the spectral distribution of the intensity of light that is transmitted through the substrate. In absorption edge reflection spectroscopy (see, e.g., M. E. Adel et al, "Noncontact Temperature Monitoring of Semiconductors by Optical Absorption Edge Sensing," *Advanced Techniques for Integrated Circuit Processing II* (SPIE Proceedings, Sept. 1992, San Jose, Calif.), Vol. 1803)), a spectral analysis of the light reflected from the substrate is performed to determine the substrate absorption edge.

In the preferred embodiment of absorption edge reflection spectroscopy, light is incident on the backside of the substrate. Some light is reflected at the substrate back surface, and the remainder is transmitted through the substrate and strikes the front surface. A fraction of this transmitted light is then reflected back through the substrate and exits the back surface. It is this component of light, which has traveled through the substrate twice, that contains the substrate absorption edge information and can therefore be utilized to determine the substrate temperature.

For a substrate that is bare or coated with only transparent overlayers, either transmission spectroscopy or reflectance spectroscopy is sufficient to provide reliable substrate temperature data. However, these techniques cannot provide accurate temperature data when the semiconducting substrate is coated with an optically opaque overlayer, which completely absorbs light transmitted through the substrate in the wavelength range corresponding to the substrate bandgap. Examples of such opaque overlayers might include: (a) a semiconductor with smaller bandgap than the substrate; (b) a heavily doped semiconductor for which free carrier absorption is dominant; (c) a semiconductor with significant optical absorption arising from crystallographic defects or incorporated impurities; or (d) a metal.

Absorption edge transmission spectroscopy fails in these cases as a temperature measurement technique for the obvious reason that no light is available for spectral analysis since all light is absorbed by the opaque overlayer. Absorption edge reflectance spectroscopy is also rendered useless as a temperature measurement technique in the presence of an optically opaque overlayer if the refractive indices of the substrate and overlayer are comparable. In this case, very little light is reflected at the interface between the substrate and overlayer, and consequently the light that returns back through the substrate is too weak in intensity for spectroscopic analysis. Formation of this return beam of light is crucial to the success of the reflectance technique because it is this beam that conveys the spectral information concerning the substrate bandgap. In many cases of practical interest, such as optically opaque semiconductor films on semiconducting substrates, the refractive index match between substrate and overlayer is sufficient to inhibit the formation of a return beam of light. Light that would normally be reflected at the bare substrate front surface is effectively lost to absorption in the overlayer, so that reflectivity measurements can no longer convey any information about substrate temperature.

Thus, the presence of an optically opaque overlayer disables techniques otherwise available to measure the temperature of semiconducting substrates, so that a need remains for a method to accurately measure the temperature of a semiconducting substrate having an optically opaque overlayer. The present invention addresses this need by generating a sufficiently intense front-surface-reflected return beam so that the absorption edge reflectance spectroscopy technique can be utilized for the noncontact determination of semiconducting substrate temperature in the presence of an opaque overlayer.

SUMMARY OF THE INVENTION

In accordance with the invention, a method is provided for measuring the temperature of a semiconducting substrate coated with an optically opaque overlayer without contacting the substrate or the overlayer. Simply stated, the present invention enables the use of a known optical techniques for noncontact temperature measurements of semiconducting substrates. More specifically, in cases where the semiconducting substrate is coated with an optically opaque overlayer, the present invention guarantees the generation of a return light beam by preventing the transmission of light into the opaque overlayer, thus preserving a reflectivity spectrum characteristic of the temperature of the semiconducting substrate.

The method of the present invention comprises the following steps:

(a) providing the semiconducting substrate having a front surface and a back surface;

(b) placing a reflective structure on the front surface of the semiconducting substrate, thereby forming an interface between the front surface and the reflective structure;

(c) coating the reflective structure and any exposed portions of the front surface of the semiconducting substrate with the optically opaque overlayer;

(d) directing a light source toward the back surface of the semiconducting substrate, such that the light is transmitted through the substrate, is reflected by the reflective structure, passes back through the substrate, and exits through the backside of the substrate, producing a reflectivity spectrum; and (e) analyzing the reflectivity spectrum of the return beam to obtain a temperature measurement of the semiconducting substrate.

Using the method of the invention thus enables temperature measurements to be made of semiconducting substrates that are coated with optically opaque overlayers. Importantly, the present invention provides a method by which the temperature of semiconducting substrates having optically opaque overlayers may be monitored for purposes of precise control during processing.

DETAILED DESCRIPTION OF THE PREFERRED EMBODIMENTS

The temperature of a semiconducting substrate may be measured by analyzing the reflectivity spectrum of light reflected from the substrate surface. While this technique is generally a reliable temperature indicator, it is rendered ineffective if the reflection of light from the front surface of the substrate is suppressed. As a case in point, an optically opaque overlayer coating a semiconducting substrate suppresses the front surface reflectivity so that the available optical techniques are in fact disabled. Consequently, accurate optical temperature measurements of such substrates have been unattainable. The present invention is directed at restoring a reflectivity spectrum for analysis in cases where an optically opaque overlayer would otherwise suppress the front-surface reflectivity.

Figure 1A:
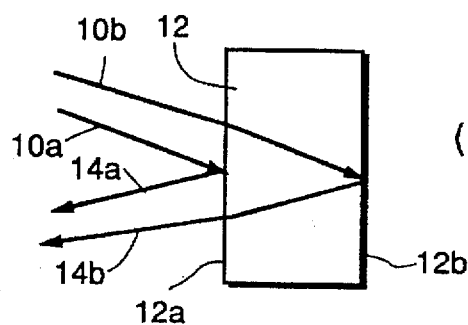
FIG. 1a is a cross-sectional view of a semiconducting substrate illuminated from the substrate backside and illustrates the reflection of light from both the front and back surfaces of a semiconducting substrate having no optically opaque overlayer.

FIG. 1a illustrates the behavior of light 10a, 10b directed toward a semiconducting substrate 12 that either has no overlayer or only a transparent overlayer (not shown). The incoming light 10a, 10b is reflected from both the back surface 12a and the front surface 12b, respectively, of the substrate 12. The component of light 14b reflected from the front surface 12b of the substrate, having passed through the substrate, has a spectral variation characteristic of the optical absorption edge of the substrate. This results in a step in the reflectivity spectrum that occurs at a wavelength, $\lambda_g$, related to the substrate optical bandgap, $E_g$, by the relation $$\lambda_g = hc/E_g,$$

where h=Planck's constant and c=speed of light. Absorption edge reflectance spectroscopy involves analyzing the reflectivity spectrum of the light 14b reflected through the substrate 12 from its front surface 12b. The contribution to reflectivity by light 14a reflected from the back surface 12a is subtracted out so that the temperature determination is based upon the reflectivity spectrum of light 14b only, having passed through the substrate 12. From the foregoing discussion, it is clear that substrate temperature determination by this technique is critically dependent on an accurate measurement of the reflectivity spectrum of light 14b reflected from the front surface 12b of the substrate shown in FIG. 1a.

Figure 2:
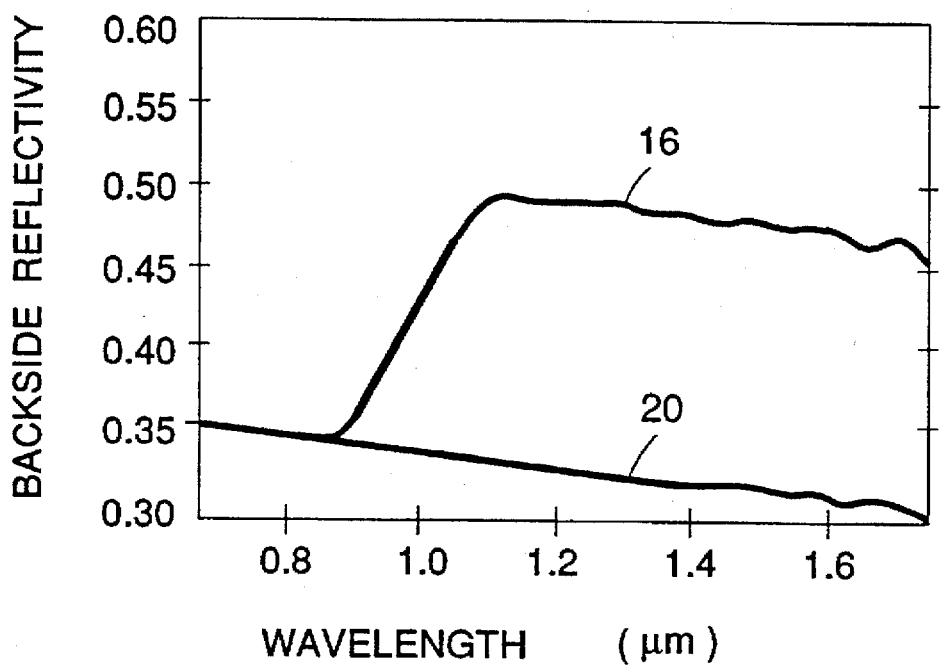
FIG. 2, on coordinates of backside reflectivity and wavelength, is a plot showing the calculated substrate optical absorption edge for a bare silicon substrate and the absence of such an edge for a silicon substrate coated with an optically opaque layer of $Hg_{0.8}Cd_{0.2}Te$.

Because the semiconductor optical bandgap is dependent on temperature, a measure of the wavelength position, $\lambda_g$, of the absorption edge step in the reflectivity spectrum can be used to determine the substrate temperature. For example, Curve 16 of FIG. 2 illustrates the reflectivity spectrum calculated for a bare silicon substrate at 300K, in which the reflectivity edge occurs at a wavelength of approximately 1.0 μm. The identification of the wavelength at which this reflectivity edge occurs is used to determine the temperature of the substrate. For example, temperature measurement using reflectance spectroscopy involves the use of an algorithm which compares the observed reflectivity spectrum with a database of reflectivity spectra taken from a calibration substrate.

Figure 1B:
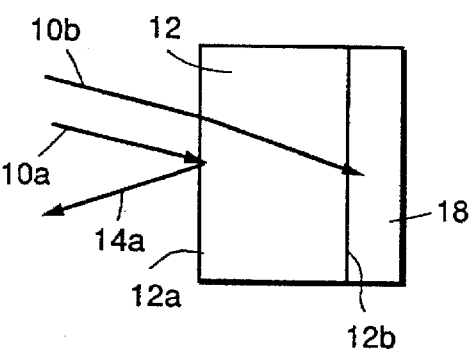
FIG. 1b is a cross-sectional view of a semiconducting substrate and illustrates the absence of a return beam of light due to presence of an optically opaque overlayer on the semiconducting substrate.

However, this absorption edge reflectance spectroscopic technique for measuring temperature of the substrate 12 only works if reflection of light from the front surface of the wafer occurs. FIG. 1b illustrates the problem addressed by the present invention, namely, the loss of a front-surface-reflected light component 14b. When a semiconducting substrate 12 is coated with an optically opaque overlayer 18, very little light is reflected by the front surface 12b of the substrate 12, and light transmitted past the surface 12b is absorbed in the overlayer 18. For example, if layer 18 is a semiconductor, typically less than 1% of incident light beam 10b is reflected at the surface 12b of the substrate 12 in FIG. 1b, and consequently, the reflectivity edge is too small to be practical for temperature determination. Curve 20 of FIG. 2 provides an example of the suppression of the reflectivity edge due to the presence of an optically opaque overlayer 18, specifically, narrow bandgap $Hg_{0.8}Cd_{0.2}Te$, which has been epitaxially deposited on a substrate 12 comprising silicon. The optically opaque overlayer 18 eliminates the reflectivity edge required for temperature measurement by optical analysis (see Example 1 below for more detail).

Figure 1C:
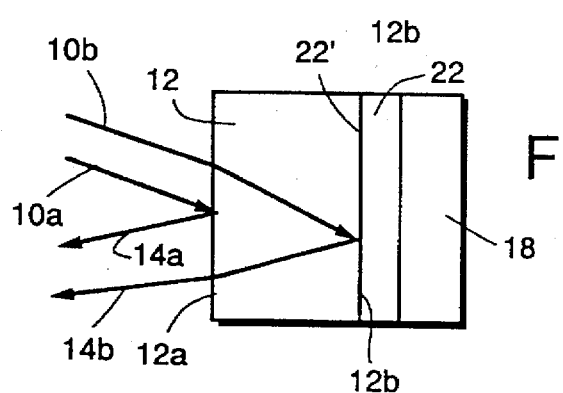
FIG. 1c is a cross-sectional view of a semiconducting substrate coated with an optically opaque overlayer and illustrates the restoration of a return light beam that traverses the semiconducting substrate toward the substrate backside by using the highly reflecting mirror structure of the present invention as inserted between the substrate and the optically opaque overlayer, the reflective mirror structure being an epitaxial crystalline structure covering the entire substrate.

The present invention, as portrayed in FIG. 1c, involves placing a highly reflective mirror structure 22 on the substrate front surface 12b, between the substrate 12 and the optically opaque overlayer 18. The mirror structure 22 is constructed to achieve high reflectivity at the substrate/mirror interface 22' in the wavelength range about the substrate absorption edge. The insertion of the reflective mirror structure prevents the overlayer from absorbing the incoming light 10b and reflects light 14b such that a reflectivity spectrum with an absorption edge step is available for analysis.

Figure 3:
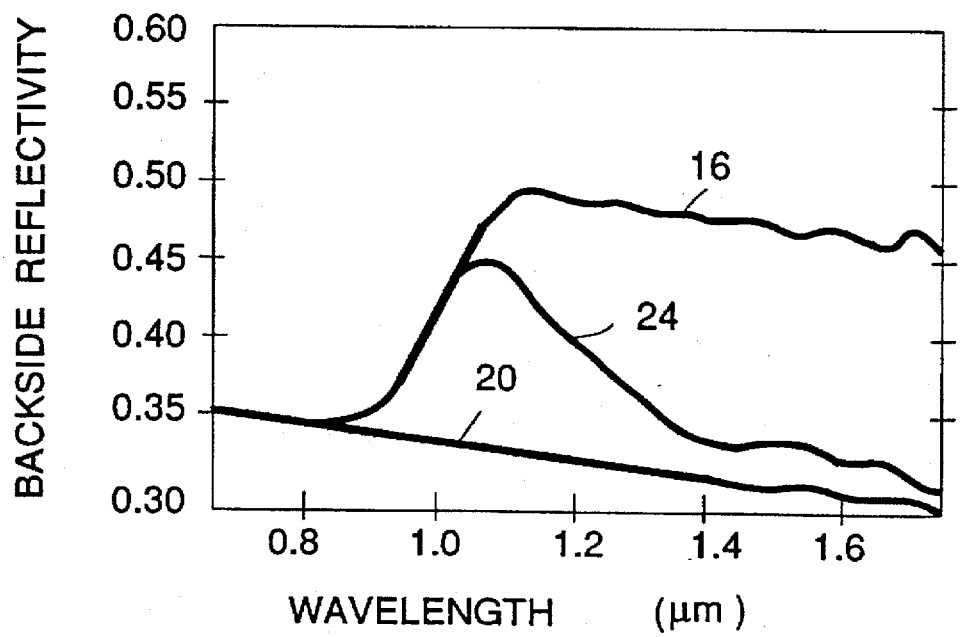
FIG. 3, on coordinates of backside reflectivity and wavelength, is a plot showing the calculated restoration of the absorption edge in the reflectivity spectrum of a silicon substrate coated with an optically opaque overlayer of $Hg_{0.8}Cd_{0.2}Te$ by inserting a PbTe/CdTe quarter wave stack (5 pairs) between the silicon substrate and the overlayer.

Curve 24 of FIG. 3 illustrates the restoration of reflectivity spectrum achieved by the present invention. Curve 16 and Curve 20, replicated from FIG. 2 and discussed above, represent the reflectivity spectrum of a bare silicon substrate and a silicon substrate coated with an optically opaque overlayer of $Hg_{0.8}Cd_{0.2}Te$, respectively. Curve 24 represents the reflectivity spectrum, as calculated from an optical model, achieved by inserting a PbTe/CdTe quarter wave stack (5 pairs) between the substrate 12 and its overlayer 18. The present invention restores the "knee" or edge in reflectivity at the 1 μm wavelength as observed for a bare silicon substrate (Curve 16).

Thus, the present invention restores the utility of optical temperature measurement techniques by inserting an appropriate high reflectivity structure 22 between the substrate 12 and the optically opaque overlayer 18 so that some light is reflected back through the substrate rather than being absorbed in the overlayer.

The most generally useful embodiment of the present invention involves the growth of an epitaxial semiconductor layer on a semiconducting substrate. The reflective mirror structure 22 of FIG. 1c would be an epitaxial crystalline structure that covers the entire substrate front surface 12b.

Figure 1D:
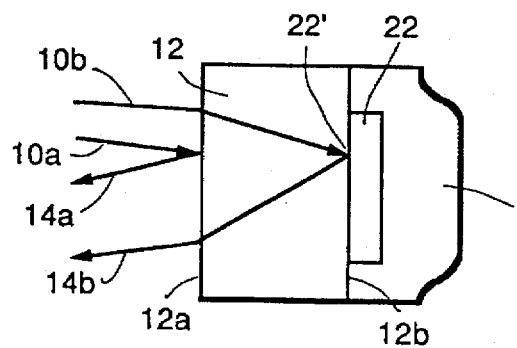
FIG. 1d is a cross-sectional view of a semiconducting substrate coated with an optically opaque overlayer and illustrates the restoration of a return light beam that traverses the semiconducting substrate toward the substrate backside by using the highly reflecting mirror structure of the present invention as inserted between the substrate and the optically opaque overlayer, the reflective mirror structure being an epitaxial crystalline structure of lesser lateral extent than the substrate.

In another embodiment of the present invention, as portrayed in FIG. 1d, the highly reflective mirror structure 22 is less extensive laterally than the substrate front surface 12b. However, the lateral dimensions of such mirror structures should be large enough to encompass the entire optical beam 10a, 10b, which is used to probe the substrate temperature and typically ranges in diameter between 1 and 5 mm. The highly reflective mirror structure 22 of FIG. 1d is an epitaxial crystalline structure.

Figure 1E:
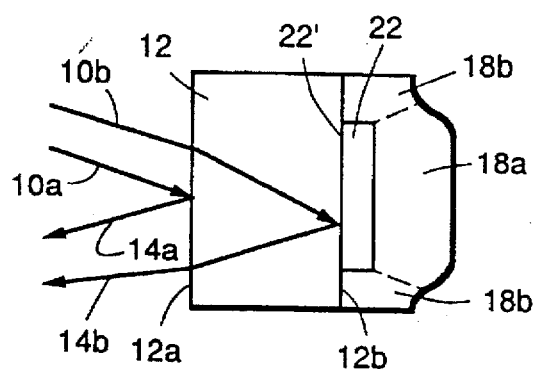
FIG. 1e is a cross-sectional view of a semiconducting substrate coated with an optically opaque overlayer and illustrates the restoration of a return light beam that traverses the semiconducting substrate toward the substrate backside by using the highly reflecting mirror structure of the present invention as inserted between the substrate and the optically opaque overlayer, the reflective mirror structure being a noncrystalline structure of lesser lateral extent than the substrate.

Finally, FIG. 1e presents an alternative embodiment of the present invention which, like FIG. 1d, portrays the highly reflective mirror structure 22 as less extensive laterally than the substrate front surface 12b. Unlike FIG. 1d, the mirror structure 22 of this embodiment need not be a single crystal, epitaxial film. Hence, the portion of the optically opaque overlayer 18a immediately above the mirror structure is wittingly sacrificed to poor crystallinity in this embodiment, while the remainder of the overlayer 18b remains relatively unaffected by the presence of the mirror structure 22.

The utility of the present invention is available to any semiconducting substrate material, including but not limited to silicon, Group III–V semiconductors, such as GaAs, and Group II–VI semiconductors, such as CdZnTe. The optically opaque overlayer 18 may comprise any material or combination of distinct materials that acts as a strong optical absorber in the wavelength range corresponding to the substrate semiconducting bandedge. For example, a GaSb overlayer is optically opaque when coating a GaAs semiconducting substrate (see Examples 4 and 5 below). Examples of opaque overlayer materials that present problems for the absorption edge reflectance spectroscopy technique include narrow bandgap semiconductors, heavily doped semiconductors with strong free carrier absorption, and semiconductors with significant optical absorption due to crystallographic defects or incorporated impurities.

In selecting the material to serve as a reflective mirror structure 22 for a given semiconducting substrate, two factors must be preliminarily considered. First and foremost, the material chosen to comprise the mirror structure must generate an adequate reflectivity spectrum in the wavelength range corresponding to the bandgap of the substrate for purposes of temperature analysis. Second, an evaluation must be made of the importance of maintaining high quality crystallinity in the portion of the optically opaque overlayer 18a immediately above the mirror structure. If high quality crystallinity is desired in this portion of the overlayer, the material chosen for the reflective mirror structure must be epitaxially deposited and must meet certain requirements for compatibility with the substrate, discussed in more detail below. On the other hand, if the crystallinity of this portion of the overlayer may be sacrificed, there are no restrictions on the choice of the material other than that it generate an adequate reflectivity spectrum.

The generation of adequate reflected light by the mirror structure is the heart of the invention. The reflectivity at the interface between a particular mirror structure and substrate must be sufficient to produce an analyzable reflectivity spectrum. In the practice of the invention, the mirror structure should minimally generate a reflectivity of approximately 0.1. Furthermore, the reflectivity of the mirror structure 22 would ideally be substantially uniform for a wavelength range at least as broad as that traversed by the substrate absorption edge over the temperature range of interest.

There are two basic forms that the mirror structure 22 may take: a single, thin-film layer or a stack comprising a plurality of layers, such as a quarter-wave stack. For a single, thin-film layer of material to serve as the mirror structure, the material must exhibit an index of refraction sufficiently different from that of the substrate 12 so that the substrate/mirror interface 22' is highly reflecting. The following formula may be used to estimate the index of refraction for the mirror structure necessary to achieve sufficient reflectivity given a particular substrate index of refraction:

$$R=[(n_r-n_s)/(n_r+n_s)]^2$$

where
R=reflectivity
$n_r$=the mirror structure index of refraction
$n_s$=the substrate index of refraction.

To illustrate, for a silicon substrate having an index of refraction of 3.84, the mirror structure must have an index of refraction less than 2.0 to achieve a reflectivity of about 0.1. Example 3 below illustrates an embodiment of the invention in which the mirror structure for a CdTe (n=2.84) substrate consists of a single thin film layer of $BaF_2$ (n=1.47), so that the reflectivity of this combination is 0.1 Other materials that may serve as single, thin-film mirror structures include $SiO_2$ (n=1.45), SiO (n=1.9), $MgF_2$ (n=1.37), and $Al_2O_3$ (n=1.6), all of which have indices of refraction substantially different from common semiconducting substrates such as CdTe (n=2.84), GaAs (n=3.65) and Si (n=3.78).

Alternatively, the mirror structure may be fashioned out of a stack comprising multiple layers, one example of which is a quarter-wave stack. A quarter-wave stack consists of an alternating sequence of two layers having different indices of refraction and thicknesses equal to λ/4n, where λ is the wavelength of peak mirror reflectivity and n is the film refractive index. This bilayer sequence is repeated as many times as necessary to generate satisfactory reflectivity at the wavelength, $\lambda_g$, of the substrate 12 absorption edge. The following formula may be used to estimate the number of layer pairs required to achieve an appropriate reflectivity given the indices of refraction for the substrate and for the materials comprising the layers in the stack:

$$R=[(1-(n_H/n_L)^{2p}(n_H^2/n_s))/(1+(n_H/n_L)^{2p}(n_H^2/n_s))]^2$$

where
R=reflectivity
p=number of pairs of layers
$n_s$=substrate index of refraction
$n_H,n_L$=indices of refraction for component layers.
(Source: *Thin Film Optical Filters* by McLeod, page 165.)

For example, a quarter-wave stack consisting of CdTe (n=2.84 at 1 μm) and CdMgTe (n=2.64 at 1 μm) placed on a CdTe substrate requires 5 bilayer periods to generate a reflectivity of at least 0.1. Examples 1, 2, 4, and 5 below illustrate various embodiments of the invention in which quarter-wave stacks consisting of bilayer periods serve as the reflective mirror structure.

The choice between a single thin-film layer and a quarter wave stack is simplified if the quality of crystallinity in the portion of the optically opaque overlayer 18a immediately above the mirror structure is inconsequential. A single, thin-film layer with a suitable index of refraction is simpler to incorporate and is preferred over a series of quarter-wave stacks. However, if high quality crystallinity is required throughout the overlayer, it is likely that the quarter-wave stack approach will be necessary. The difficulty in locating a single material that both exhibits a sufficiently different index of refraction from the substrate as well as sustains the crystalline quality of the overlayer 18 may prove so daunting as to be practically impossible. In the event an epitaxial crystalline reflective mirror structure is deemed necessary to protect the crystallinity of the overlayer, the material comprising the reflective mirror structure 22 must be a crystalline structure in epitaxial registry with the semiconducting substrate 12 which means that each layer comprising the reflective mirror structure must be in epitaxial registry with the semiconducting substrate.

To illustrate acceptable choices of materials for epitaxially deposited mirror structures, one preferred embodiment for a CdZnTe substrate coated with an optically opaque overlayer of HgCdTe would comprise a quarter-wave stack consisting of bilayers of $Hg_{1-x}Cd_xTe$ and $Hg_{1-y}CdyTe$, with x≠y. The bilayers are repeated as necessary to achieve the necessary reflectivity as calculated above. Alternatively, the bilayers could consist of $Cd_{1-x}Mg_xTe$ and $Cd_{1-x}Mg_yTe$, with x≠y. For a GaAs substrate coated with an optically opaque overlayer of a narrow bandgap GaInAsSb quaternary alloy, a preferred embodiment for the epitaxially deposited mirror structure would comprise a quarter-wave stack consisting of bilayers of $Al_xGa_{1-x}As$ and $Al_yGa_{1-y}As$, with x≠y.

For non-epitaxial mirror structures, the only requirements regarding material selection are the generation of adequate reflectivity and the provision of uniform reflectivity over the measurement wavelength range. Accordingly, the field of acceptable materials greatly expands compared to that available for epitaxial mirror structures. A single, thin-film layer may comprise such materials as $SiO_2$(n=1.45), SiO (n=1.9), $MgF_2$ (n=1.37) and $Al_2O_3$ (n=1.6), all of which have indices of refraction substantially different from common semiconducting substrates such as CdTe (n=2.84), GaAs (n=3.65) and Si (n=3.78). If a quarter-wave stack approach proves necessary, a preferred embodiment consists of layers of the substrate material, in polycrystalline form, alternated with layers of a suitable dielectric such as $SiO_2$, SiO, $MgF_2$, or $Al_2O_3$.

The preferred thickness for the reflective mirror structure 22 is $\lambda_g$/4n, where $\lambda_g$ is the wavelength corresponding to the substrate's bandgap and n is the mirror refractive index, when the mirror structure is in the form of a single, thin-film layer. For example, a reflective mirror structure comprising $SiO_2$ (n=1.45) should preferably have a thickness of approximately 0.172 μm for temperature measurement of a Si substrate with an absorption edge around 1 μm. In the case of a quarter wave stack, each layer is also $\lambda_g$/4n thick. For example, each bilayer of a quarter-wave stack on a Si substrate should preferably have a thickness of about 0.24 μm, assuming indices of 1.45 ($SiO_2$) and 3.78 (Si) for the constituent materials of the stack.

The placement of the mirror structure 22 with respect to the placement of the optically opaque overlayer 18 may be accomplished in at least two ways. The mirror layer 22 may be deposited on the substrate 12 as a preliminary part of the process that deposits the opaque overlayer 18. Alternatively, the mirror layer 22 may be deposited in a completely separate process from the deposition of the overlayer 18. For instance, a composite substrate/mirror structure could be purchased from a wafer vendor, and the overlayer could be subsequently deposited by the wafer purchaser.

Figure 9:
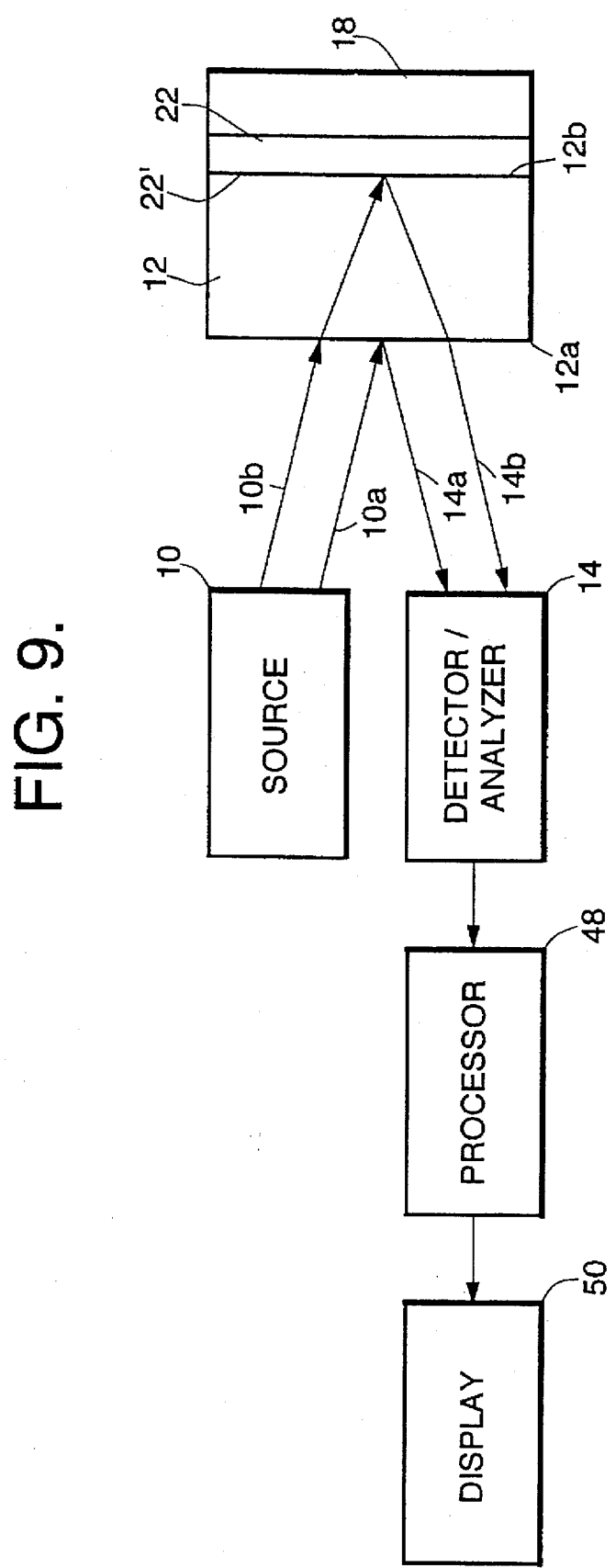
FIG. 9 is a schematic diagram of apparatus used in the practice of the present invention.

FIG. 9 depicts apparatus employed in the practice of the present invention. For convenience, the combination of the highly reflective mirror structure 22 and the substrate 12 and the optically opaque overlayer 18 shown in FIG. 1c is shown. However, since the invention is directed to the use of the highly reflective mirror structure 22 and since the other components of the apparatus are known in the prior art, the combinations shown in FIGS. 1d and 1e may easily be substituted for the combination shown in FIG. 1c.

The light 10a, 10b is provided by a light source 10 whose spectrum overlaps the absorption edge of the substrate 12; the light 14a, 14b is detected and spectrally analyzed by a light detector/analyzer 14. The reflectivity spectrum of the detected light is then processed by a programmed algorithm in a processor 48 to determine the wavelength location of the absorption edge of the substrate 12, which can be correlated to the temperature of the substrate via predetermined calibration data, as is well-known in this art. The temperature is then displayed on a display 50, such as a CRT.

EXAMPLES

Example 1

Semiconducting substrate:Si

Optically opaque overlayer:$Hg_{0.8}Cd_{0.2}Te$

Reflective mirror structure: PbTe/CdTe quarter-wave stack

FIG. 3 illustrates the change in reflectivity spectrum when a bare silicon semiconducting substrate 12 (Curve 16) is coated with an optically opaque overlayer 18 of $Hg_{0.8}Cd_{0.2}Te$ (Curve 20). Further, FIG. 3 illustrates the restoration of an absorption edge step in the reflectivity spectrum by inserting a highly reflective mirror structure 22 consisting of a PbTe/CdTe quarter-wave stack between the substrate 12 and the overlayer 18 (Curve 24). The curves presented in FIG. 3 have been calculated from a standard multilayer optical model, assuming a 300K substrate temperature and the following refractive indices: Si=3.78, CdTe=2.84, $Hg_{0.8}Cd_{0.2}Te$=3.59, and PbTe=4.0. The quarter wave stack consists of 5 bi- layer periods with CdTe thickness=0.097 μm and PbTe thickness=0.069 μm.

Curve 16 represents the reflectivity spectrum of a bare silicon semiconducting substrate. In the absence of an optically opaque film, the reflectivity spectrum of a silicon semiconducting substrate exhibits an absorption edge at a wavelength of about 1 μm. The shift of this edge to longer wavelengths with increasing temperature can be utilized to determine the substrate temperature by an appropriate optical technique, such as reflectance spectroscopy or transmission spectroscopy.

Curve 20 illustrates the suppression of the reflectivity edge which occurs when an optically opaque overlayer of narrow bandgap $Hg_{0.8}Cd_{0.2}Te$ is deposited on the bare silicon substrate used to generate Curve 16. The real refractive index of $Hg_{0.8}Cd_{0.2}Te$ ($n_{HgCdTe}$=3.59 at 1 μm) is not sufficiently different from that of the substrate ($n_{si}$=3.78 at 1 μm) to cause significant reflectance at the substrate/overlayer interface. Furthermore, light entering the opaque $Hg_{0.8}Cd_{0.2}Te$ overlayer is lost to absorption and is unavailable for reflection from the substrate front surface. Thus, no reflectivity edge is observable in Curve 20.

Curve 24 represents the restoration via the present invention of the reflectivity edge of the silicon substrate despite an overlying coating of absorbing $Hg_{0.8}Cd_{0.2}Te$. A PbTe/CdTe quarter wave stack (5 pairs) is inserted between the silicon substrate and the optically opaque layer of $Hg_{0.8}Cd_{0.2}Te$. The insertion of this highly reflective mirror structure results in the restoration of a reflectivity edge at a wavelength of approximately 1 μm as observed for a bare silicon substrate in Curve 16. Thus, the present invention enables the use of absorption edge reflectance spectroscopy for determining the temperature of the semiconducting substrate despite the presence of the strongly opaque $Hg_{0.8}Cd_{0.2}Te$ overlayer.

Example 2

Semiconducting substrate:CdTe

Optically opaque overlayer:$Hg_{0.8}Cd_{0.2}Te$

Reflective mirror structure:CdTe/$Hg_{0.6}Cd_{0.4}Te$ quarter-wave stack

Figure 4:
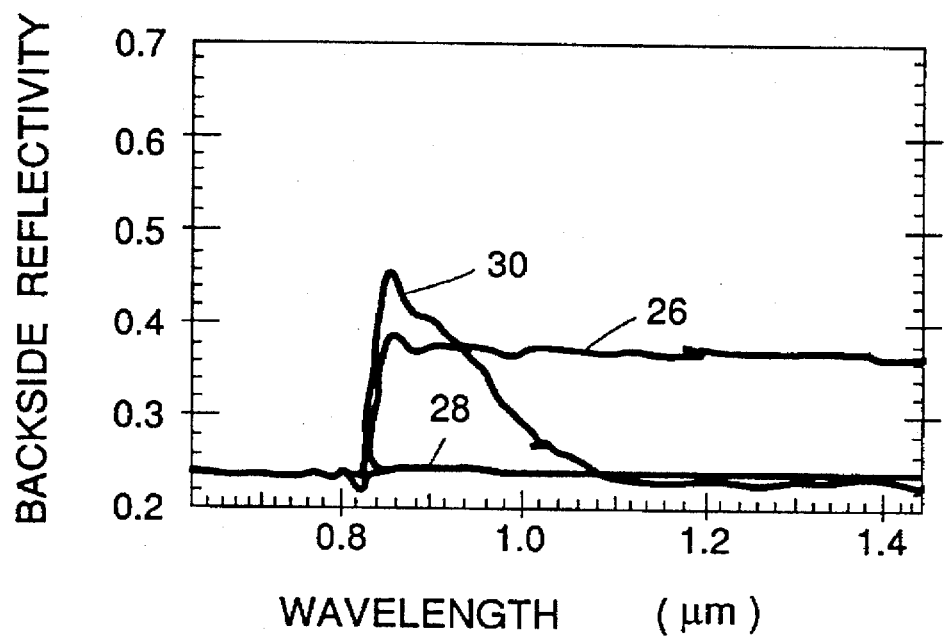
FIG. 4, on coordinates of backside reflectivity and wavelength, is a plot showing the calculated restoration of the absorption edge in the reflectivity spectrum of a CdTe substrate coated with an optically opaque overlayer of $Hg_{0.8}Cd_{0.2}Te$ by inserting a $CdTe/Hg_{0.6}Cd_{0.4}Te$ quarter wave stack (5 pairs) between the substrate and the overlayer.

FIG. 4 illustrates the change in reflectivity spectra when a bare CdTe semiconducting substrate is coated with an optically opaque overlayer of $Hg_{0.8}Cd_{0.2}Te$. Further, FIG. 4 illustrates the restoration of a measurable absorption edge in the reflectivity spectrum by inserting a highly reflective mirror structure consisting of a CdTe/$Hg_{0.6}Cd_{0.4}Te$ quarter-wave stack between the substrate and the overlayer. The curves presented in FIG. 4 have been calculated from an optical model, assuming a 300K substrate temperature, and the following refractive indices: CdTe=2.84, $Hg_{0.8}Cd_{0.2}Te$=3.59, and $Hg_{0.6}Cd_{0.4}Te$=3.40. The quarter wave stack consists of 5 bilayer periods with CdTe thickness=0.079 μm and $Hg_{0.6}Cd_{0.4}Te$ thickness=0.066 μm.

Curve 26 represents the reflectivity spectrum of a bare CdTe semiconducting substrate. In the absence of an optically opaque film, the reflectivity spectrum of a CdTe semiconducting substrate exhibits an edge at a wavelength of about 0.84 μm.

Curve 28 illustrates the suppression of the reflectivity edge observed when an optically opaque overlayer of narrow bandgap $Hg_{0.8}Cd_{0.2}Te$ is deposited on the bare CdTe substrate used to generate Curve 26. The layer of $Hg_{0.8}Cd_{0.2}Te$ fails to reflect light because its real refractive index ($n_{HgCdTe}$=3.59 at 0.84 μm) is not sufficiently different from that of the substrate ($n_{CdTe}$=2.84 at 0.84 μm) to cause significant reflectance at the substrate/overlayer interface.

Curve 30 represents the restoration of the reflectivity edge for the CdTe substrate of Curve 28. A CdTe/$Hg_{0.6}Cd_{0.4}Te$ quarter wave stack (5 pairs) is inserted between the silicon substrate and the optically opaque layer of $Hg_{0.8}Cd_{0.2}Te$. The insertion of this highly reflective mirror structure results in the restoration of a reflectivity edge at a wavelength of approximately 0.84 μm as observed for a bare CdTe substrate in Curve 26.

Example 3

Semiconducting substrate:CdTe

Optically opaque overlayer:$Hg_{0.8}Cd_{0.2}Te$

Reflective mirror structure:$BaF_2$

Figure 5:
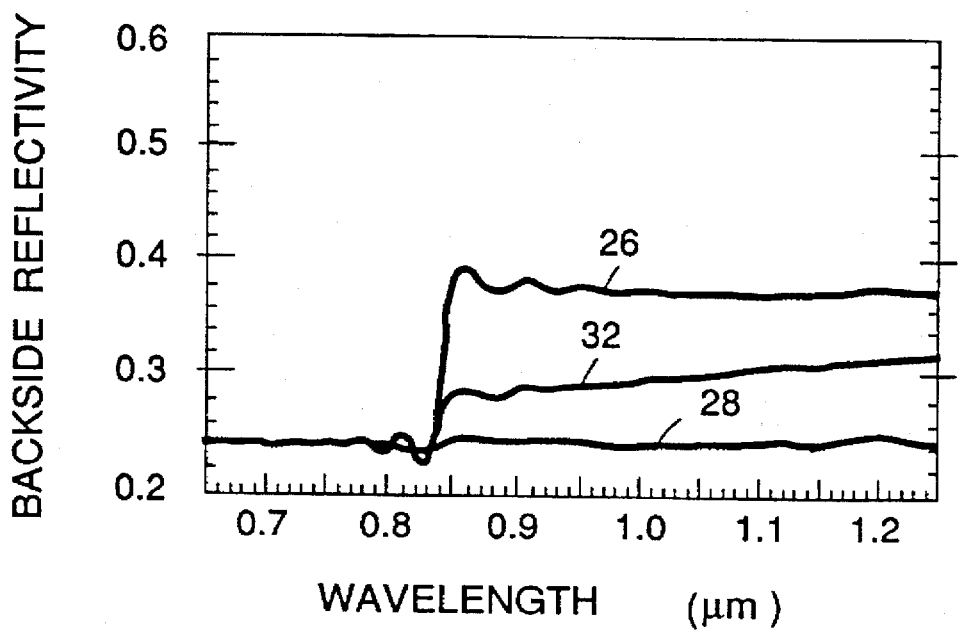
FIG. 5, on coordinates of backside reflectivity and wavelength, is a plot showing the calculated restoration of the absorption edge in the reflectivity spectrum of a CdTe substrate coated with an optically opaque overlayer of $Hg_{0.8}Cd_{0.2}Te$ by inserting a 0.1 μm-thick $BaF_2$ layer between the substrate and the overlayer.

Like FIG. 4, FIG. 5 depicts the change in the reflectivity spectrum when a bare CdTe semiconducting substrate is coated with an optically opaque overlayer of narrow bandgap $Hg_{0.8}Cd_{0.2}Te$. FIG. 5 illustrates the restoration of the reflectivity edge by inserting a highly reflective mirror structure consisting of a 0.1 μm-thick $BaF_2$ layer, rather than the CdTe quarter-wave stack of FIG. 4, between the substrate and the overlayer. The curves presented in FIG. 5 have been calculated from an optical model, assuming a 300K substrate temperature, and the following refractive indices: CdTe=2.84, $Hg_{0.8}Cd_{0.2}Te$=3.59, and $BaF_2$=1.47.

Curves 26 and 28 of FIG. 5 are identical to those discussed in Example 2 above regarding FIG. 4.

Curve 32 represents the restoration of the reflectivity edge. A 0.1 μm-thick layer of $BaF_2$ is inserted between the CdTe substrate and the optically opaque layer. The insertion of this highly reflective mirror structure results in the restoration of a reflectivity edge at a wavelength of approximately 0.84 μm, like that observed for a bare CdTe substrate in Curve 26.

Example 4

Semiconducting substrate: GaAs

Optically opaque overlayer: GaSb

Reflective mirror structure: GaAs/AlAs quarter-wave stack

Figure 6:
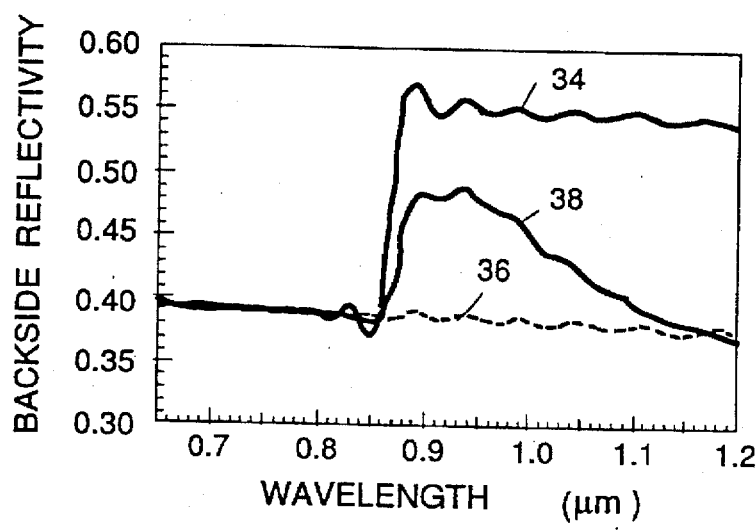
FIG. 6, on coordinates of backside reflectivity and wavelength, is a plot showing the calculated restoration of the absorption edge in the reflectivity spectrum of a GaAs substrate coated with an optically opaque overlayer of GaSb by inserting an GaAs/AlAs quarter wave stack (5 pairs) between the substrate and the overlayer.

FIG. 6 depicts the change in reflectivity spectrum observed when a bare GaAs semiconducting substrate is coated with an optically opaque overlayer of GaSb. Further, FIG. 6 illustrates the restoration of a reflectivity step achieved by inserting a highly reflective mirror structure consisting of an AlAs/GaAs quarter-wave stack between the substrate and the overlayer. The curves presented in FIG. 6 have been calculated from an optical model, assuming a 300K substrate temperature, and the following refractive indices: GaAs=3.65, AlAs=2.97, and GaSb=4.24. The quarter wave stack consists of 5 bilayer periods with GaAs thickness=0.062 µm and AlAs thickness=0.076 µm.

Curve 34 represents the reflectivity spectrum of a bare GaAs semiconducting substrate. In the absence of an optically opaque film, the reflectivity of a GaAs semiconducting substrate exhibits an edge at a wavelength of about 0.88 µm.

Curve 36 illustrates the suppression of the reflectivity edge observed when an optically opaque overlayer of GaSb is deposited on the bare GaAs substrate used to generate Curve 34. The layer of GaSb fails to reflect light because its real refractive index ($n_{GaSb}$=4.24 at 0.87 µm) is not sufficiently different from that of the substrate ($n_{GaAs}$=3.65 at 0.87 µm) to cause significant reflectance at the substrate/overlayer interface.

Curve 38 represents the restoration of the reflectivity edge for the GaAs substrate of Curve 36. A GaAs/AlAs quarter wave stack (5 pairs) is inserted between the GaAs substrate and the optically opaque overlayer of GaSb. The insertion of this highly reflective mirror structure results in the restoration of an absorption edge in the reflectivity spectrum at a wavelength of approximately 0.88 µm, very close to that observed for a bare GaAs substrate in Curve 34.

Example 5

Semiconducting substrate: GaAs

Optically opaque overlayer: GaSb

Reflective mirror structure: GaAs/AlAs quarter-wave stack

Figure 7:
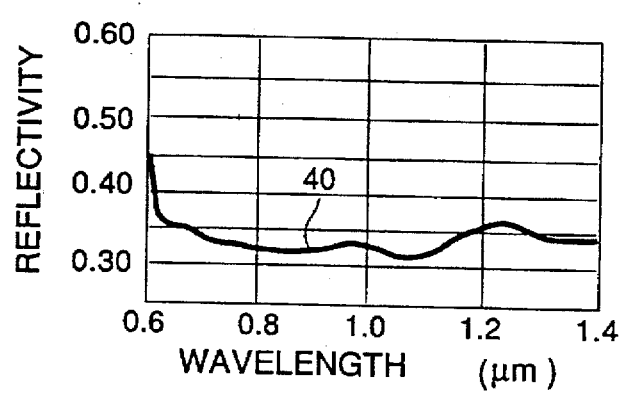
FIG. 7, on coordinates of backside reflectivity and wavelength, is a plot showing the absence of an absorption edge step in the experimental 300K backside reflectivity spectrum for 1 μm-thick GaSb on a GaAs substrate (the bare GaAs substrate absorption edge would ordinarily be observable at 0.88 μm wavelength)

FIG. 7, using experimental data, illustrates the suppression in reflectivity spectrum at 20° C. when a bare GaAs semiconducting substrate is coated with a 1.0 µm thick, optically opaque overlayer of GaSb (Curve 40). In the absence of an optically opaque film, the reflectivity of a GaAs semiconducting substrate exhibits an edge at a wavelength of about 0.88 µm at 300K, as discussed in Example 4 above.

Figure 8:
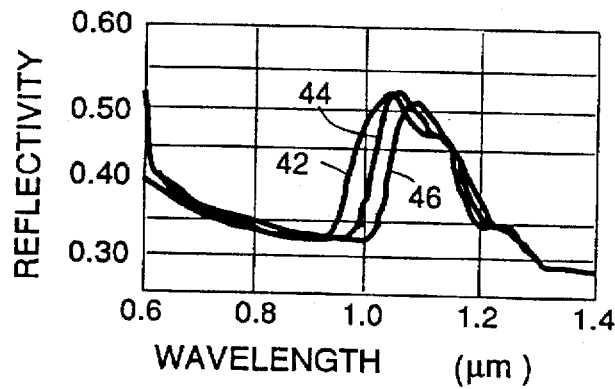
FIG. 8, on coordinates of backside reflectivity and wavelength, is a plot of experimental reflectivity data showing: (a) the restoration of an absorption edge step in the reflectivity spectrum for a GaAs substrate coated with a 1 μm-thick GaSb overlayer, and (b) the shift of the step to longer wavelength as the substrate temperature is increased, achieved by inserting a 5-period GaAs/AlAs quarter-wave stack between the substrate and the overlayer.

The three curves shown in FIG. 8 illustrate the restoration of an edge in the reflectivity spectrum that shifts to longer wavelengths as the substrate temperature is increased. This result was achieved by inserting a highly reflective mirror structure consisting of a 5-period GaAs/AlAs quarter-wave stack between the substrate and the overlayer. The reflectivity data represent temperatures of 200° C., 280° C., and 360° C. in Curves 42, 44, and 46, respectively. The curves presented in FIG. 8 are experimental data.

Thus, there has been disclosed a method of noncontact temperature measurement of a semiconducting substrate having an optically opaque overlayer. It will be readily apparent to those of ordinary skill in this art that various changes and modifications of an obvious nature may be made without departing from the spirit of the invention, and all such changes and modifications are considered to fall within the scope of the invention, as defined by the appended claims.

What is claimed is:

1. A noncontact method for temperature measurement of a semiconducting substrate having an optically opaque overlayer comprising:

(a) providing said semiconducting substrate having a front surface and a back surface, said semiconducting substrate having an absorption edge and a bandgap;

(b) forming a reflective structure on at least a portion of said front surface of said semiconducting substrate, thereby creating an interface between said front surface and said reflective structure;

(c) coating said reflective structure and any exposed portions of said front surface of said semiconducting substrate with said optically opaque overlayer;

(d) directing a light source toward said back surface of the semiconducting substrate, such that light from said light source is transmitted through said semiconducting substrate and is reflected at said interface between said front surface and said reflective structure, and exits said back surface, thereby producing a reflectivity spectrum;

(e) receiving said reflectivity spectrum; and (f) analyzing said reflectivity spectrum to obtain a temperature measurement of said semiconducting substrate.

2. The method of claim 1 in which said reflective structure comprises a single thin film of material having an index of refraction different from that of said semiconducting substrate such that said interface between said front surface and said reflective structure reflects light in a wavelength range corresponding to said semiconducting substrate absorption edge.

3. The method of claim 2 in which said interface exhibits a reflectivity R of at least 0.1 in a wavelength range corresponding to said semiconducting substrate absorption edge, said reflectivity ratio R being defined by the formula $$R=[(n_r-n_s)/(n_r+n_s)]^2$$

where

R=reflectivity $n_r$=index of refraction of said reflective structure $n_s$=index of refraction of said substrate.

4. The method of claim 2 in which said single thin film of material has a thickness of approximately $\lambda_g/4n_{ref}$, where $\lambda_g$=hc/Eg is the light wavelength corresponding to said semiconducting substrate bandgap, Eg, $n_{ref}$ is the index of refraction for said reflective structure, h is Planck's Constant, and c is the velocity of light.

5. The method of claim 2 in which said single thin film of material comprises a crystalline structure in epitaxial registry with said semiconducting substrate.

6. The method of claim 2 in which the index of refraction of said single thin film is substantially uniform throughout said single, thin film layer.

7. The method of claim 1 in which said reflective structure comprises a multiple layer stack of at least two layers chosen such that said interface between said multilayer stack and said semiconducting substrate reflects light in a wavelength range corresponding to said semiconducting substrate absorption edge.

8. The method of claim 7 in which said interface exhibits a reflectivity R of at least 0.1 in a wavelength range corresponding to said semiconducting substrate absorption edge.

9. The method of claim 7 in which said multiple layer stack is composed of layers whose crystalline structures are in epitaxial registry with said semiconducting substrate.

10. The method of claim 7 in which said multilayer stack is a quarter-wave stack that comprises a repeating bilayer sequence of two distinct materials whose refractive indices differ and whose individual layer thicknesses are approximately $\lambda/4n$, where $\lambda$ is the wavelength of peak mirror reflectivity and is approximately equal to $\lambda_g$, which is the wavelength corresponding to said substrate absorption edge and n is said layer refractive index.

11. The method of claim 10 in which said interface exhibits a reflectivity R defined by the formula $$R=[(1-(n_H/n_L)^{2p}(n_H^2/n_s))/(1+(n_H/n_L)^{2p}(n_H^2 n_s))]^2$$

where

R=reflectivity p=number of pairs of layers $n_s$=substrate index of refraction $n_H, n_L$=indices of refraction for component layers.

12. The method of claim 10 in which said quarterwave stack is composed of layers whose crystalline structures are in epitaxial registry with said semiconducting substrate.

13. A configuration for non-contact temperature measurement of a semiconducting substrate having an optically opaque overlayer, comprising:

(a) said semiconducting substrate having a front surface and back surface and an absorption edge and a bandgap;

(b) a reflective structure comprising material having an index of refraction different from that of said semiconducting substrate reflectivity in a wavelength range corresponding to the bandgap of the substrate formed on at least a portion of said front surface of said semiconducting substrate, creating an interface between said front surface and said reflective structure to reflect light in a wavelength range corresponding to the absorption edge of said semiconducting substrate to produce a reflectivity spectrum available for temperature estimation by optical analysis, and (c) said optically opaque overlayer formed over said reflective structure and any exposed portions of said semiconducting substrate.

14. Apparatus for non-contact temperature measurement of a semiconducting substrate having a front surface and a back surface and having an optically opaque overlayer formed on said front surface, comprising:

(a) a source of light for directing light onto said back surface of said semiconducting substrate;

(b) a reflective structure formed on at least a portion of said from surface of said semiconducting substrate and interposed between said front surface and said optically opaque overlayer, said reflective structure reflecting incident light directed toward said back surface of said semiconducting substrate and through said semiconducting substrate, said reflected light producing a reflectivity spectrum available for temperature estimation by optical analysis;

(c) a light detector for receiving said reflectivity spectrum;

(d) an analyzer for analyzing said reflectivity spectrum and relating said reflectivity spectrum to said temperature of said semiconducting substrate; and (e) a display for displaying said temperature of said semiconducting substrate.

* * * * *